US011356788B2

United States Patent
Yamkovoy et al.

(10) Patent No.: US 11,356,788 B2
(45) Date of Patent: Jun. 7, 2022

(54) SPATIALIZED AUDIO RENDERING FOR HEAD WORN AUDIO DEVICE IN A VEHICLE

(71) Applicant: Bose Corporation, Framingham, MA (US)

(72) Inventors: Paul G. Yamkovoy, Acton, MA (US); Matthew Neil Ruwe, Hopedale, MA (US); Dylan Armand Baranik, Marlborough, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/930,984

(22) Filed: Jul. 16, 2020

(65) Prior Publication Data

US 2022/0021999 A1 Jan. 20, 2022

(51) Int. Cl.
*H04S 7/00* (2006.01)
*H04R 5/04* (2006.01)
*H04R 5/033* (2006.01)
*G06F 3/01* (2006.01)
*H04L 65/60* (2022.01)
*H04W 4/029* (2018.01)

(52) U.S. Cl.
CPC ............. *H04S 7/30* (2013.01); *G06F 3/012* (2013.01); *G06F 3/017* (2013.01); *H04L 65/60* (2013.01); *H04R 5/033* (2013.01); *H04R 5/04* (2013.01); *H04W 4/029* (2018.02); *H04S 2400/11* (2013.01)

(58) Field of Classification Search
USPC ................ 381/59, 85, 300, 370, 376, 386
See application file for complete search history.

(56) References Cited

U.S. PATENT DOCUMENTS

| 9,313,359 B1 | 4/2016 | Stojancic et al. |
| 10,028,071 B2 * | 7/2018 | Satongar ............. H04R 5/04 |
| 10,194,259 B1 | 1/2019 | Martin et al. |
| 10,575,118 B2 | 2/2020 | Martin et al. |
| 2008/0201148 A1 * | 8/2008 | Desrochers ............... 704/257 |
| 2011/0153044 A1 | 6/2011 | Lindahl et al. |
| 2016/0071526 A1 | 3/2016 | Wingate et al. |

(Continued)

FOREIGN PATENT DOCUMENTS

| EP | 2811389 A1 | 12/2014 |
| WO | 2019168930 A1 | 9/2019 |

OTHER PUBLICATIONS

The Virtual 4D Menu, published by Bragi, available via YouTube on May 16, 2017 (screen shot included), available at: https://www.youtube.com/watch?v=VH1eTNWfqKY.

*Primary Examiner* — Yosef K Laekemariam
(74) *Attorney, Agent, or Firm* — Hoffman Warnick LLC (57) ABSTRACT

Various implementations include systems for rendering 3D audio signals for a vehicle operator. In particular implementations, a method of spatializing audio for an audio device worn on a head of an operator includes: receiving audio data and location data, the location data indicating where the audio data should be rendered relative to the vehicle; tracking a head position of the operator of the vehicle; calculating a compensated location of where the audio data should be rendered based on the location data and the head position of the operator of the vehicle; and spatially rendering, using the audio device, the audio data at the compensated location.

18 Claims, 6 Drawing Sheets

(56) References Cited

U.S. PATENT DOCUMENTS

| | | |
|---|---|---|
| 2016/0198282 A1 | 7/2016 | Kim et al. |
| 2017/0245124 A1 | 8/2017 | Child et al. |
| 2018/0146198 A1 | 5/2018 | Atluru et al. |
| 2019/0268712 A1 | 8/2019 | Martin et al. |
| 2020/0142667 A1* | 5/2020 | Querze .................. H04S 7/304 |
| 2020/0261017 A1 | 8/2020 | Ruwe et al. |

* cited by examiner

SPATIALIZED AUDIO RENDERING FOR HEAD WORN AUDIO DEVICE IN A VEHICLE

TECHNICAL FIELD

This disclosure generally relates to head worn audio devices utilized when operating vehicles. More particularly, the disclosure relates to rendering spatialized audio in head worn audio devices utilized when operating vehicles, which compensate for a head position of the user.

BACKGROUND

Head worn audio devices such as headsets are commonly utilized when operating vehicles such as aircraft (e.g., by flight crews), armored/combat vehicles (e.g., by tank operators), and motorcycles, to name a few examples. Headsets typically include a pair of earphones and a microphone, such as a boom microphone, that allows the user to communicate with others over an intercom system. In addition to providing voice communications, headsets can receive and output audio alerts via the earphones to the user. Alerts may be generated by an electronic flight bag (EFB) that is configured to receive and process object position data, e.g., from a sensor such as a collision avoidance system. Upon hearing an alert, the user can take action, e.g., to avoid a collision.

SUMMARY

All examples and features mentioned below can be combined in any technically possible way.

Systems and approaches are disclosed for rendering spatialized audio on a head worn audio device, such as a headset, for a vehicle operator, which compensates for the position of the user's head. Some implementations provide methods that include: receiving audio data and location data, the location data indicating where the audio data should be rendered relative to the vehicle; tracking a head position of the operator of the vehicle; calculating a compensated location of where the audio data should be rendered based on the location data and the head position of the operator of the vehicle; and spatially rendering, using the audio device, the audio data at the compensated location.

In additional particular implementations, an audio device configured to be worn on a head of an operator of a vehicle is provided having: a memory; and a processor, wherein the processor is configured to: receive audio data and location data, the location data indicating where the audio data should be rendered relative to the vehicle; track a head position of the operator of the vehicle; calculate a compensated location of where the audio data should be rendered based on the location data and the head position of the operator of the vehicle; and spatially render the audio data at the compensated location.

Implementations may include one of the following features, or any combination thereof.

In some cases, audio data and location data are generated from a computing device configured to manage information associated with the vehicle.

In other cases, the computing device includes an electronic flight bag (EFB).

In certain aspects, the EFB generates at least one of the audio data and location data in response to signals received from an object position data source.

In particular implementations, at least one of the audio data and location data are received from an object position data source.

In some cases, the audio data and location data are received wirelessly from the computing device.

In certain aspects, the head position is determined from a sensor attached to the audio device.

In other aspects, the head position is determined from a sensor managed by the vehicle.

In still other aspects, the head position is determined using an inertial measurement unit (IMU) and a bias drift correction system.

In some implementations, the audio device calculates the compensated location.

In certain cases, the computing device calculates the compensated location.

In certain aspects, the bias drift correction system is configured to: collect and store a new head position data sample from the IMU in a first data buffer; determine a median value from the first data buffer; in response to the median value being greater than a previously determined median value for a previous data sample, store the previous data sample in a second buffer; estimate a slope of the data in the second buffer; and utilize the slope to correct the new head position data sample.

In some implementations, the vehicle includes one of: a motor vehicle, a railed vehicle, a watercraft, an aircraft, a spacecraft, a remotely operated vehicle, and a virtual vehicle.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims

It is noted that the drawings of the various implementations are not necessarily to scale. The drawings are intended to depict only example aspects of the disclosure, and therefore should not be considered as limiting the scope of the implementations. In the drawings, like numbering represents like elements between the drawings.

DETAILED DESCRIPTION

Various implementations describe solutions for rendering spatialized audio on a head worn audio device, such as a headset, for a vehicle operator, which compensates for the position of the user's head. Spatialized audio is a sound effect technique that causes sound sources to appear to emanate from points in a three dimensional (3D) space. Using such techniques, sound sources provided in a head worn audio device can be localized within the three dimensional space around the user, e.g., above, below, behind, to the side, etc. Accordingly, a vehicle operator, such as a pilot in an aircraft, can receive audio alerts and the like over their headset that appear to emanate from a particular direction. For example, an alert associated with a potential hazard can be heard emanating from a particular point in space, thus allowing the user to quickly take corrective action to avoid the hazard. Implementations provided herein further compensate for the position of the user's head when the alert is generated, thus providing a more accurate spatialized rendering.

Although generally described with reference to two-way communications headsets, the solutions disclosed herein are intended to be applicable to any type of head worn audio device capable of rendering 3D spatialized audio to the user. Further, although specific use cases described herein involve flight crews within an aircraft, it is understood that the described solutions are intended to be applicable to any type of air, land, water or space vehicle, including, e.g., spacecraft, watercraft, railed vehicles, motor vehicles, airplanes, helicopters, etc. Furthermore, the solutions could also be used in virtual environments in which the user is remotely operating a vehicle, including gaming, drone piloting, etc. Accordingly, presentation of specific implementations are intended to facilitate understanding through the use of examples, and should not be taken as limiting either the scope of this disclosure or the scope of claim coverage.

Additionally, although the implementations disclosed herein are described as including head worn audio devices that provide two-way audio communications, the solutions can be implemented with one-way audio communication systems (i.e., devices that only output electronically generated audio), or no communications, at all. Further, what is disclosed herein is applicable to head worn audio devices that are wirelessly connected to other devices, that are connected to other devices through electrically and/or optically conductive cabling (i.e., wired configurations), or that are not connected to any other device, at all. These teachings are applicable to head worn audio devices having physical configurations structured to be worn in the vicinity of either one or both ears of a user, including and not limited to, headphones with either one or two earpieces, over-the-head headphones, on-ear headphones or headsets, over-the-ear headphones or headsets, earbuds (e.g., wired or truly wireless earbuds), ear hooks that are worn on the top of a user's ears, behind-the neck headphones, headsets with communications microphones (e.g., boom microphones), in-the-ear or behind-the-ear hearing aids, wireless headsets (e.g., earsets), audio eyeglasses, single earphones or pairs of earphones, as well as hats, helmets, clothing or any other physical configuration incorporating one or two earpieces to enable audio communications and/or ear protection. In general, the earpiece(s) or head-worn audio device(s) may be intended to provide at least some level of ear occlusion, such as over-ear earcups or in-ear earbuds, or they may be intended to not provide any ear occlusion, such as an open-ear audio device (e.g., glasses that direct audio toward a user's ear, devices that rest on the top of a user's ear to direct audio toward the user's ear, devices that utilize bone conduction technology, etc.).

In various implementations, the head worn audio devices described herein may incorporate active noise reduction (ANR) functionality that may include either or both of feedback-based ANR and feedforward-based ANR, in addition to possibly further providing pass-through audio and audio processed through known hearing aid signal processing such as dynamic range compression.

Additionally, the solutions disclosed herein are intended to be applicable to a wide variety of accessory devices, i.e., devices that can communicate with a head worn audio device and assist in the processing of audio signals. Illustrative accessory devices include electronic flight bags (EFBs), tablets, smartphones, Internet of Things (IoT) devices, computing devices, specialized electronics, vehicles, computerized agents, carrying cases, charging cases, smart watches, other wearable devices, etc.

In various implementations, the head worn audio device and an accessory device communicate wirelessly, e.g., using Bluetooth or other wireless protocol, and/or via a wired link. In certain implementations, the head worn audio device and accessory device reside within several meters of each other to, e.g., facilitate wireless data communication.

Figure 1:
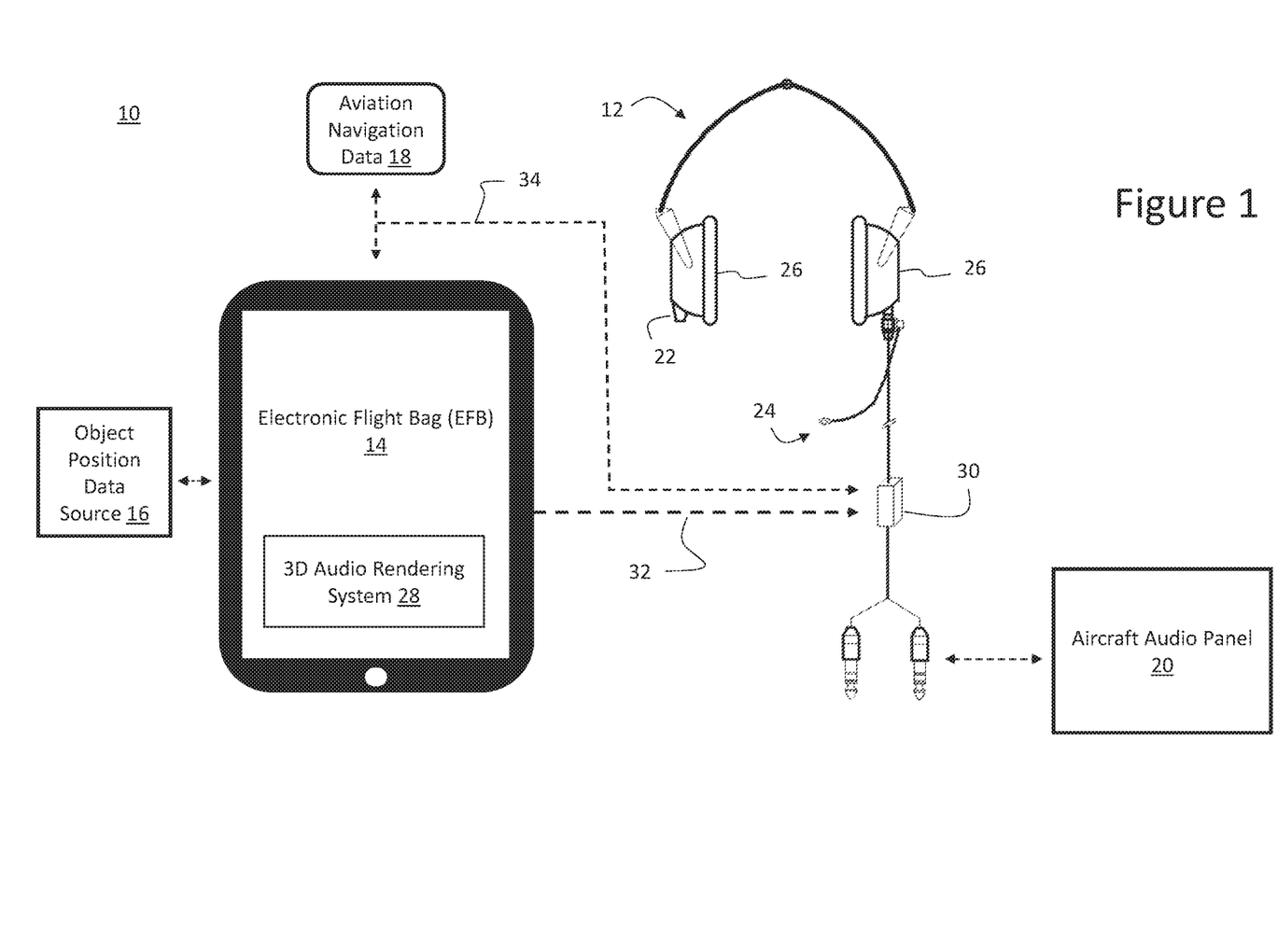
FIG. 1 depicts a communication system that provides spatialized audio renderings according to various implementations.

FIG. 1 depicts an illustrative aircraft communication system 10 that provides 3D spatialized audio renderings with head position compensation according to various implementations. In the implementations shown, system 10 includes a two-way communication headset 12 that includes a pair of ear cups 26 that output audio to the user and a boom microphone 24 that captures voice signals from the user. In certain implementations, the headset 12 interfaces with an aircraft audio panel 20 that provides an intercom service to receive and transmit audio signals to other users. In addition, an accessory device, in this case a tablet running an electronic flight bag (EFB) 14, also outputs audio signals to the headset 12 via a wired and/or wireless communication link 32. EFB 14 is a commonly used information management software system that allows flight crews to perform flight management tasks. Although not described in detail herein, it is understood that EFB 14 may be configured to display a variety of aviation data including moving map displays, navigation information, weather information, etc. In various embodiments, EFB 14 is configured to receive: (1) aviation navigation data 18 via a wired or wireless (e.g., Bluetooth or Wi-Fi), communication link 34; (2) data from an object position data source 16 (e.g., collision avoidance sensors, beacons, weather data, etc.) via, e.g., a Wi-Fi signal; and (3) digital data (including, e.g., head position data) from the headset 12 via a wired or wireless (e.g., Bluetooth or Wi-Fi) communication link 34.

In other implementations, rather than using an EFB 14, a general or specific computer program product running on a general purpose or specific purpose computer may be utilized that performs some or all of the features described herein. For example, a computer program product may be integrated into a given technology platform, such as that deployed in a military application (e.g., an armored vehicle or tank operator), waterway navigation, spacecraft, land vehicle, etc. As such, it is understood that the descriptions herein involving EFBs are for illustrative purposes only, and are not intended to be limiting to a particular computational platform.

In the implementation shown, EFB 14 also includes a 3D audio rendering system 28 that calculates and transmits spatialized 3D audio signals to the headset 12 via communication link 32. Spatialized 3D audio signals may for example include alerts generated in response to data received from the object position data source 16 or other systems on the aircraft. As described in further detail herein, 3D audio rendering system 28 utilizes head position data of the user to calculate a compensated location of the spatialized 3D audio signals to allow for the 3D audio that is intended to be spatialized relative to the vehicle to be compensated for the direction that the user is looking. In some implementations, eye-tracking is used to know where the user is looking, while in other implementations, the direction that the user is looking is inferred by calculating the head position data of the user one or more sensors connected to headset 12 and/or one or more sensors that are not connected to headset 12 but are configured to detect head movement of the user (e.g., a driver-facing camera in a car).

In various implementations, headset 12 includes one or more head tracking sensors 22 that capture head position data of the user, e.g., that determine if the user's head is in the straight ahead home position, turned to the side, turned up or down, etc. Each included sensor 22 could be integrated into the headset 12, connected to the headset 12 (e.g., using a wired connection via a peripheral port and/or wireless connection), and/or be implemented external to the headset (i.e., not connected to the headset 12).

In certain implementations, one or more head tracking sensors 22 may include a pluggable device (e.g., external and/or modular device) that plugs into an ear cup 26 interface that powers the sensors 22 and communicates with a control module 30. In the case of an external sensor 22, the sensor data could be sent to a peripheral device, such as the user's phone for processing to determine a compensated location.

Head tracking sensors 22 may utilize any technology for generating position data, including, e.g., an inertial measurement unit (IMU). In other cases, the sensors 22 could include at least one of a camera, LIDAR, light detectors/reflectors, audio detectors (e.g., ultrasound, such as having the headset's external microphones emit and detect the ultrasound to calculate head position), etc. Also note that in various implementations a full IMU (which typically includes both accelerometers and gyroscopes, and optionally, a magnetometer) need not be used. Accordingly, sensors 22 could, e.g., just include at least one accelerometer or at least one gyroscope.

In certain implementations, control module 30 includes a primary microcontroller, user controls (e.g., volume, equalization, etc.), power supply circuits, a wireless communication system such as a Bluetooth radio, a data interface, and a cable interface (e.g., for receiving an ICS cable).

Figure 2:
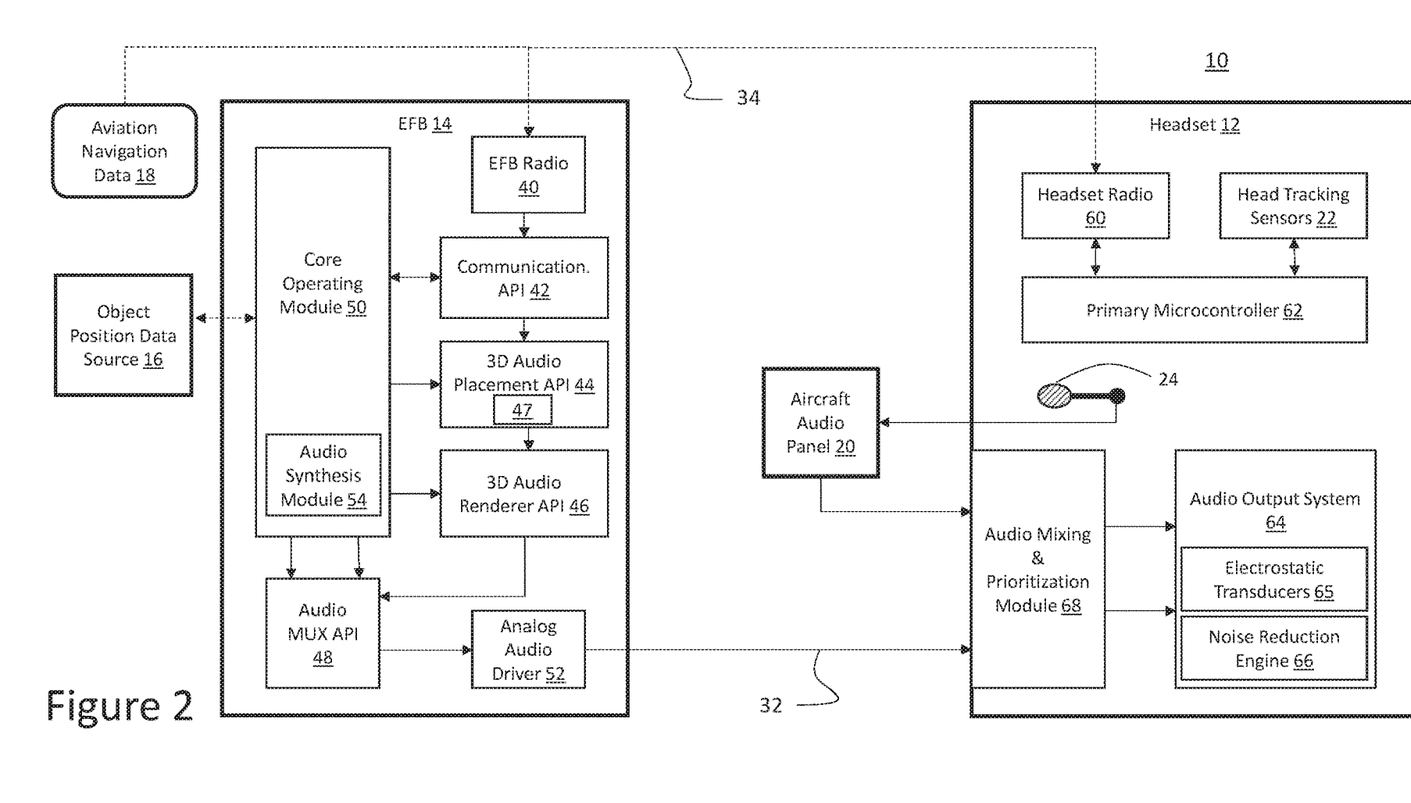
FIG. 2 depicts a block diagram of an illustrative communication system according to various implementations.

FIG. 2 depicts a block diagram detailing an illustrative process implemented by system 10 to render 3D spatialized audio. As noted herein, headset 12 is coupled with EFB 14 via a communication (e.g., Bluetooth, WiFi) link 34 that connects an EFB radio 40 with a headset radio 60. Thus, in this implementation, a wireless configuration is utilized for data link 34, but in other implementations, a wired configuration can be utilized for data link 34, while in some implementations a combination of wireless and wired connections can be used for data link 34. In some embodiments, EFB 14 includes a core operating module 50, which may for example include a general purpose processor, and a set of application programming interface (API) modules 42, 44, 46, 48, that interface with the core operating module 50. Initially, a subscriber handshake may be performed by the core operating module 50 via data link 34 and communication API 42 to authenticate the headset 12 including, e.g., checking licensing eligibility.

Once authenticated, headset radio 60 continuously transmits head tracking data obtained from head tracking sensor 22 via the primary microcontroller 62 over the data link 34, e.g., at 50 samples per second. The head tracking data generally includes accelerometer and gyroscope measurements, which may for example be in a Quaternion or Euler format.

The EFB radio 40 receives the raw data and provides the data to the communication API 42. In various embodiments, the communication API 42 sorts the raw head position data into accelerometer and gyroscope measurements. For example, the data may be sorted into three sets of accelerometer and three sets of gyroscope measurements in a repeatable manner, e.g., every 20 milliseconds or at a frequency of 50 Hz. Once sorted, the accelerometer and gyroscope data is sent to a 3D audio placement API 44 where head position is calculated. In certain implementations, 3D audio placement API 44 (or some module) also implements a bias drift correction algorithm 47 (described in further detail herein).

At the same time, EFB 14 also receives sensor data, such as traffic information and the like from a system such as an object position data source 16, automatic dependent surveillance-broadcast system, etc., via, e.g., a Wi-Fi link. In response to a detected traffic event (such as a nearby aircraft, hazard, or potential collision), core operating module 50 generates an audible alert (e.g., utilizing an audio synthesis module 54) and forwards the traffic event data (e.g., a location relative to the vehicle) to the 3D audio placement API 44. The 3D audio placement API 44 combines the traffic event data with the head position data to calculate a compensated 3D audio placement location for the alert. The compensated placement location is then passed to a 3D audio rendering API 46, which also receives the audible alert, and preconfigures a 3D audio spatialization of the alert corresponding to the traffic event data and head position at the moment when the alert is to be played. An audio multiplexor (MUX) API 48 then locates the alert at the spatial location and outputs the spatialized alert via an analog output driver 52 to the headset 12 over audio link 32.

Once communicated, the 3D spatialized alert is received by an audio mixing and prioritization module 68 at the headset 12. Module 68 outputs the spatialized alert to the audio output system 64, which includes electrostatic transducers (i.e., speakers) 65, and optionally, a noise reduction engine 66. The spatialized alert may be outputted such that it interrupts or overlays other audio outputs from the aircraft audio panel 20.

Figure 3:
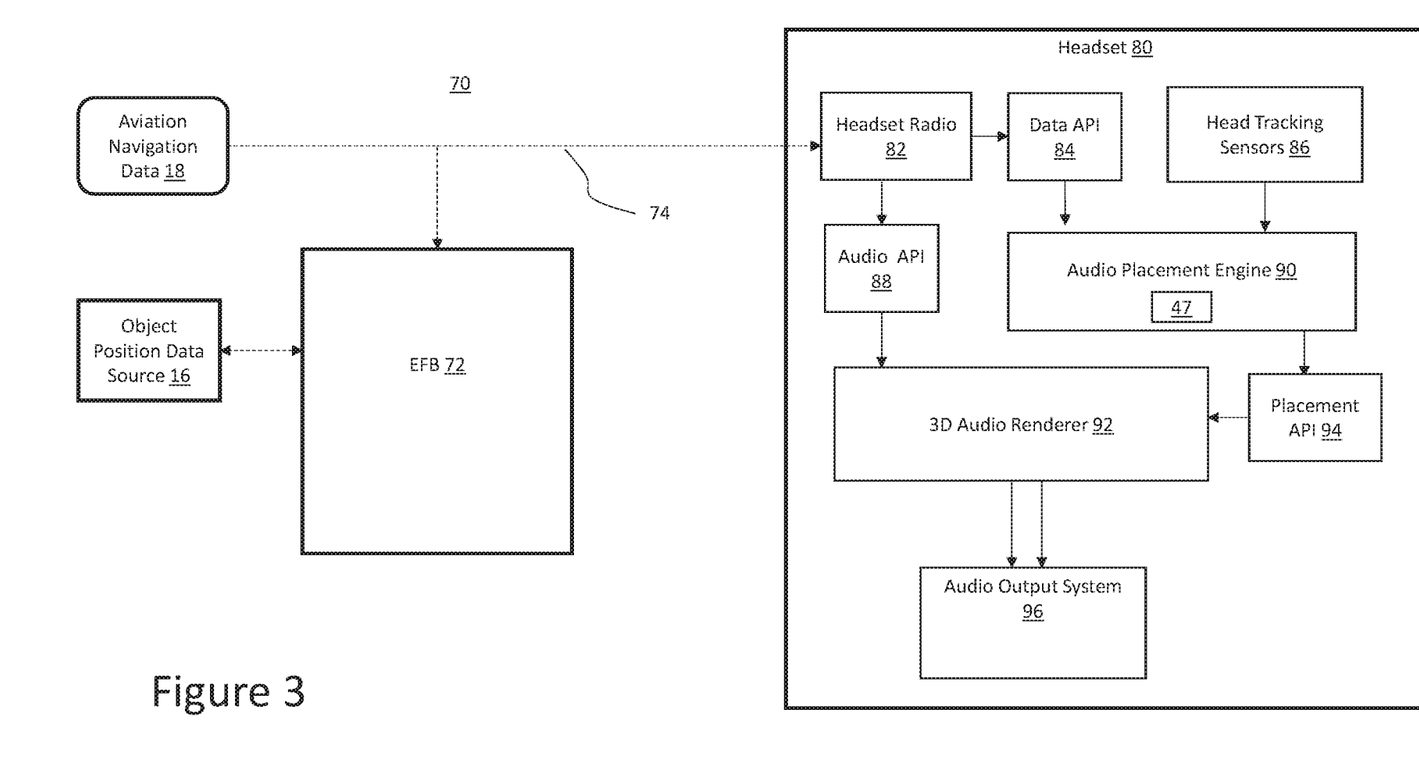
FIG. 3 depicts a block diagram of a further communication system that provides spatialized audio renderings according to various implementations.

FIG. 3 depicts a further embodiment of an aircraft communication system 70 in which the spatialized audio rendering is primarily calculated at the headset 80, rather than the EFB 72. In this implementation, object position data source 16 (and/or, e.g., an automatic dependent surveillance-broadcast system) is linked to EFB 72 via a Wi-Fi link. EFB 72 may, e.g., include a moving map application that calculates potential hazards around the aircraft and which generates visual and audible warning messages advising the pilot about the hazards. In certain embodiments, EFB 72 communicates with a headset radio 82 via communication link 72 using, e.g., a Bluetooth radio, a Bluetooth SPP data protocol to exchange digital data and a Bluetooth A2DP audio protocol to send audio messages to the headset 80.

At the headset 80, digital data is directed through data API 84 to audio placement engine 90 and audio data is directed through audio API 88 to 3D audio renderer 92. Prior to forwarding an audible alert to audio output system 96, digital location data is first sent to the audio placement engine 90 advising where the hazard is located in 3D space. At the same time, head position data from head tracking sensors 86 is fed to the audio placement engine 90, which is combined with the digital location data of the hazard to create a compensated location. The compensated location is passed to a placement API 94, and onto 3D audio renderer 92, which generates and forwards a spatialized rendering of the alert at the compensated location to the audio output system 96.

Figure 4:
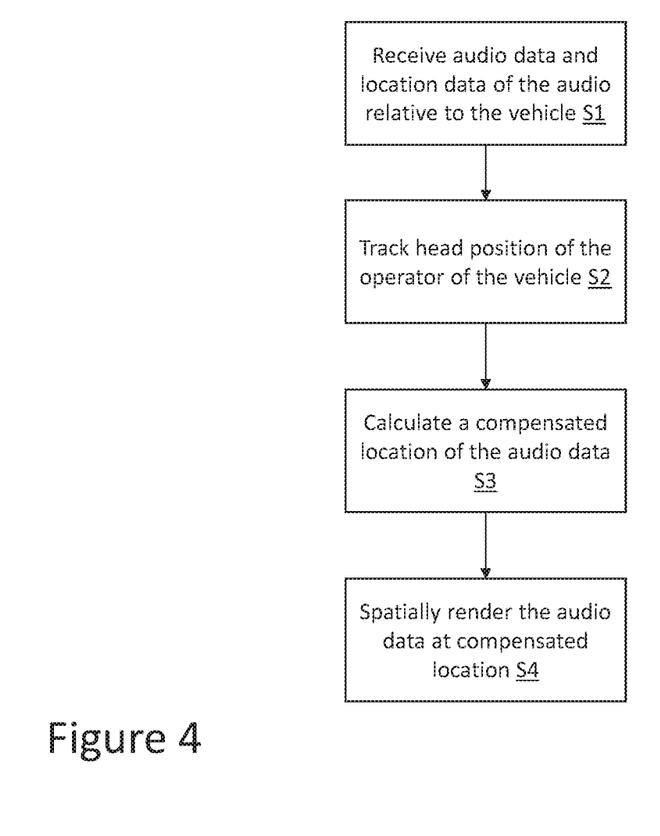
FIG. 4 depicts a flow diagram of a process of generating spatialized audio renderings according to various embodiments.

FIG. 4 depicts a flow diagram of a process of generating spatialized audio renderings within a vehicle for an operator, with reference to FIG. 1. At S1, audio data is received, along with location data of where the audio data should be rendered relative to the vehicle. For example, an audio alert warning of a nearby object may be received at an EFB 14 or similar system by an object position data source 16. At S2, the head position of the operator of the vehicle is tracked, e.g., using on more sensors 22. At S3, a compensated location of the audio data is calculated indicating where the audio data should be rendered based on the location data and the head position of the operator. At S4, the audio data is spatially rendered at the compensated location using an audio device.

In an illustrative embodiment, the spatial rendering may be processed and generated in a full three-dimensional space. In other embodiments however, at least one of tracking a head position, calculating a compensated location, or spatially rendering the audio data may be done in a spatially limited manner. For instance, at least one of these processes may be implemented in limited space such as a single plane (e.g., a horizontal plane) or only with respect to the left/right rotation of a user's head (i.e., the yaw of the user's head). In one example implementations, the vertical component may be eliminated to reduce computation and/or playback complexity, while still providing useful audio location information for the user. Utilizing a limited spatial rendering could be helpful to quickly identify the location of a static information source that does not move relative to the vehicle, such as a cockpit gauge or indicator. Understandably, incorporating full audio spatializing would provide a highly robust system, however, the additional complexity and computational resources may or may not be worth the tradeoff.

Figure 5:
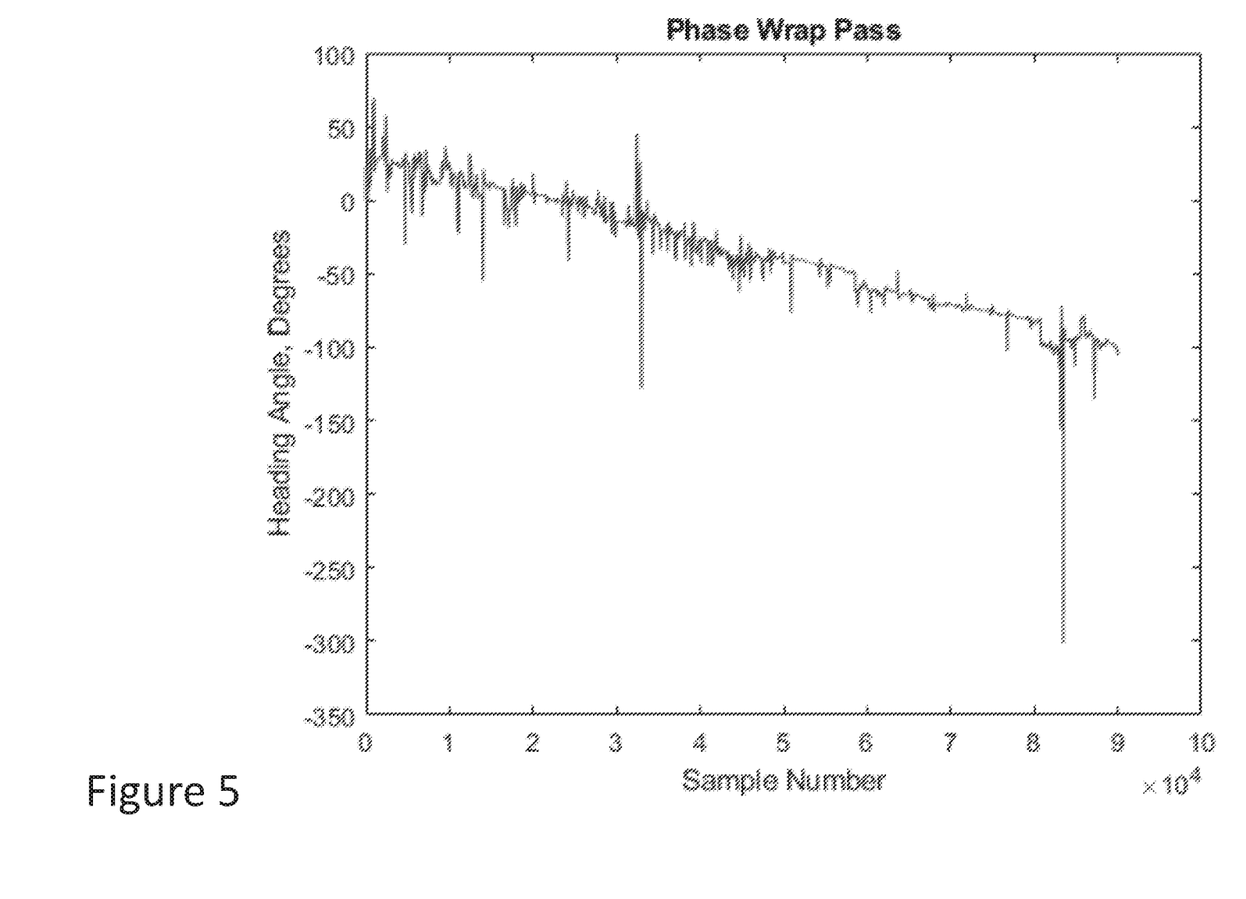
FIG. 5 depicts a graph showing bias drift associated with head position data.
Figure 6:
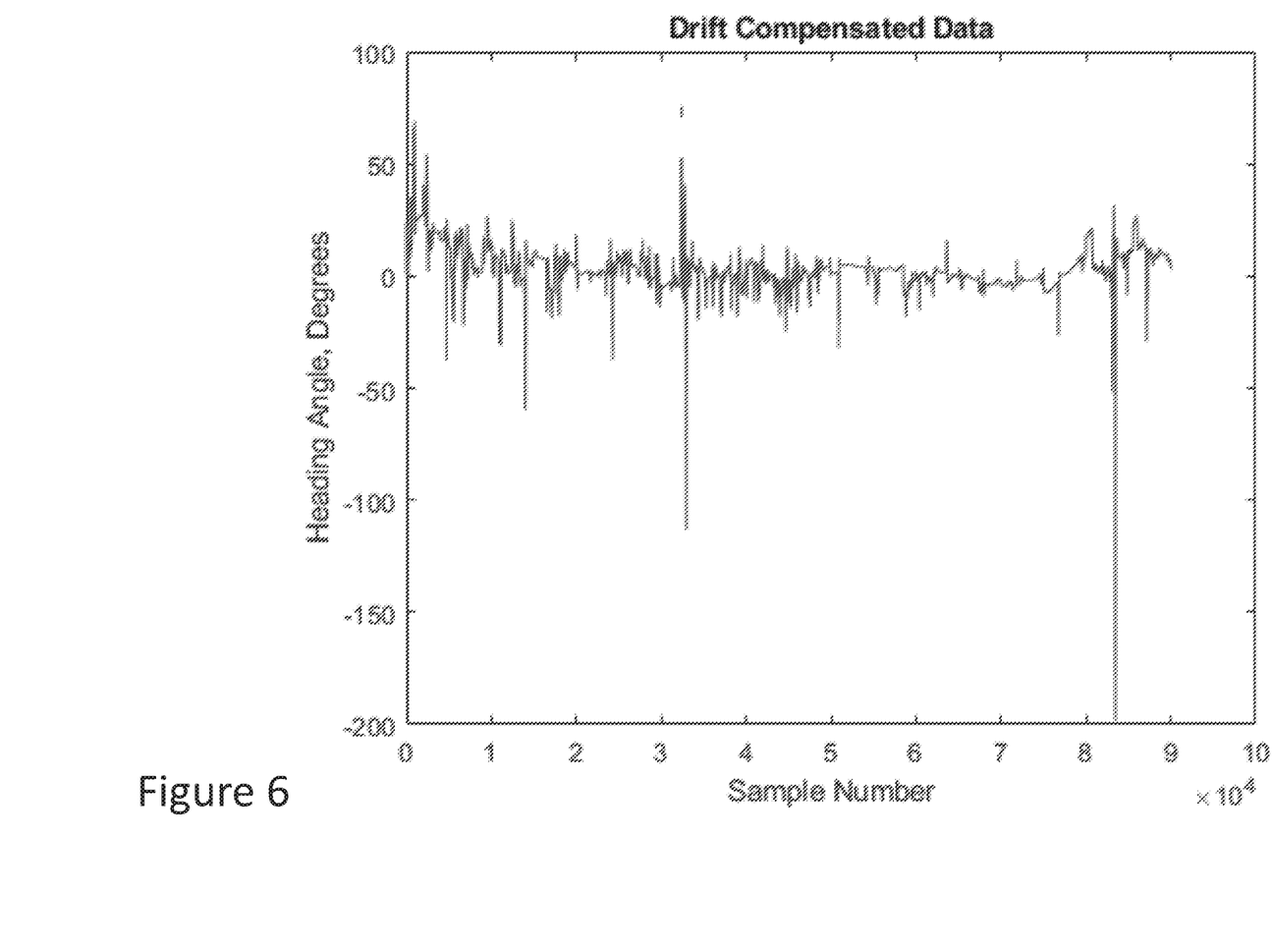
FIG. 6 depicts a graph showing drift compensated data according to various implementations.

As previously noted, a bias drift correction algorithm 47 may also be deployed. Inertial measurement units (IMU) that track head position are known to perform well in short time intervals. In other words, relative motion that occurred in short time intervals can be measured accurately. However, due to the integrating nature of measurements, associated errors are also accumulated, thus resulting in a drift of the original reference point (i.e., bias drift). To address this issue, a bias drift correction algorithm 47 can be utilized to correct for the drift. FIG. 5 depicts an example of bias drift showing a measured head angle over a sequence of samples as determined from a head tracking sensor for a user that is primarily looking straight ahead, such as a pilot. In this case, the head angle of the user should primarily be at around 0 degrees, indicating a straight ahead, or "home" position (such as a primary position of comfort for a user). Spikes in the graph indicated times when the user moved his or her head left of right. As is evident, over time, the calculated head angle of the user's head in a home position has drifted. FIG. 6 depicts the head angle of the user after the bias drift correction algorithm 47 has been applied. As is evident, the calculated head angle of the user's head in a home position is primarily at approximately 0 degrees.

In certain embodiment, bias drift correction algorithm 47 may be implemented as follows. Firmware, e.g., in a microcontroller located in the EFB, headset, or elsewhere, is configured to collect each incoming head position sample into a 3-depth circular buffer implementing a first-in, first-out (FIFO) structure according to the data field. The median value is then selected from the 3-depth FIFO to perform median filtering, which will limit transient spikes in the data.

Each newly acquired sample when complemented with two previous samples creates a vector of three samples. The lowest and highest samples (also referred to as "wild point" samples) are discarded accepting only median value samples. This ensures that "out of trend" samples are weeded out. An example of such a "wild point" sample may include a sample that was acquired when the user inadvertently hit the sensor with or against an object resulting in a measured acceleration outside the dynamic range of the sensor. The firmware takes the median value selected by the 3-depth FIFO and compares it to a predetermined threshold value. The threshold value is based on an expected range of anticipated head movement value changes that are significantly higher than drift related value changes. If the new sample exceeds the value of the threshold when compared with the previous sample, the most current or prior sample is placed into a further FIFO, referred to as the long window. In the long window, a least squares fit is performed. The least squares fit provides an estimate of the slope of the overall data, which can help predict drift from the sensor. The output of the least squares fit is a scalar value calculated at a specific point corresponding to the newest sample in the long window. The drift compensated data is calculated as the incoming head position sample minus the least squares fit over the long window. The output data is organized by the corresponding data field. Each measured sample, if accepted, is adjusted by applying a correction which is derived from the calculation of a least square fit value of the long window. This removes slow changing bias drift contribution to the signal, leaving only fast rate of change head movement contribution to the signal.

According to various embodiments, solutions are provided that generate 3D audio renderings to vehicle operators that compensate for the head location of the user. In this manner, if the user's head is not in the home position when an alert is rendered, the compensated location of the audio rendering will account for the current position of the user's head. In addition, a bias drift compensation algorithm 47 may be deployed to compensate for bias drift associated with the user's head position data.

It is understood that one or more of the functions of the described systems may be implemented as hardware and/or software, and the various components may include communications pathways that connect components by any conventional means (e.g., hard-wired and/or wireless connection). For example, one or more non-volatile devices (e.g., centralized or distributed devices such as flash memory device(s)) can store and/or execute programs, algorithms and/or parameters for one or more described devices. Additionally, the functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions. All or part of the functions can be implemented as, special purpose logic circuitry, e.g., an FPGA (field programmable gate array) and/or an ASIC (application-specific integrated circuit). Processors suitable for the execution of a computer program include, by way of example, both general and special purpose microprocessors, and any one or more processors of any kind of digital computer. Generally, a processor may receive instructions and data from a read-only memory or a random access memory or both. Components of a computer include a processor for executing instructions and one or more memory devices for storing instructions and data.

It is noted that while the implementations described herein utilize microphone systems to collect input signals, it is understood that any type of sensor can be utilized separately or in addition to a microphone system to collect input signals, e.g., accelerometers, thermometers, optical sensors, cameras, etc.

Additionally, actions associated with implementing all or part of the functions described herein can be performed by one or more networked computing devices. Networked computing devices can be connected over a network, e.g., one or more wired and/or wireless networks such as a local area network (LAN), wide area network (WAN), personal area network (PAN), Internet-connected devices and/or networks and/or a cloud-based computing (e.g., cloud-based servers).

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. A method of spatializing audio for an audio device worn on a head of an operator of a vehicle, comprising:
   receiving audio data and location data, the location data indicating where the audio data should be rendered relative to the vehicle;
   tracking a head position of the operator of the vehicle, wherein the head position is determined using an inertial measurement unit (IMU) and a bias drift correction system;
   calculating a compensated location of where the audio data should be rendered based on the location data and the head position of the operator of the vehicle; and
   spatially rendering, using the audio device, the audio data at the compensated location.

2. The method of claim 1, wherein the audio data and location data are generated from a computing device configured to manage information associated with the vehicle.

3. The method of claim 2, wherein the computing device comprises an electronic flight bag (EFB).

4. The method of claim 3, wherein the EFB generates at least one of the audio data and location data in response to signals received from an object position data source.

5. The method of claim 1, wherein at least one of the audio data and location data are received from an object position data source.

6. The method of claim 2, wherein the audio data and location data are received wirelessly from the computing device.

7. The method of claim 1, wherein the audio device calculates the compensated location.

8. The method of claim 2, wherein the computing device calculates the compensated location.

9. The method of claim 1, wherein the IMU is attached to the audio device.

10. The method of claim 1, wherein the bias drift correction system is configured to:
    collect and store a new head position data sample from the IMU in a first data buffer;
    determine a median value from the first data buffer;
    in response to the median value being greater than a previously determined median value for a previously collected data sample, store the previous data sample in a second buffer;
    estimate a slope of the data in the second buffer; and
    utilize the slope to correct the new head position data sample.

11. The method of claim 1, wherein the vehicle comprises one of a motor vehicle, a railed vehicle, a watercraft, an aircraft, a spacecraft, a remotely operated vehicle, and a virtual vehicle.

12. An audio device configured to be worn on a head of an operator of a vehicle, comprising:
    a memory; and
    a processor, wherein the processor is configured to:
       receive audio data and location data, the location data indicating where the audio data should be rendered relative to the vehicle;
       track a head position of the operator of the vehicle, wherein the head position is determined using an inertial measurement unit (IMU) and a bias drift correction system;
       calculate a compensated location of where the audio data should be rendered based on the location data and the head position of the operator of the vehicle; and
       spatially render the audio data at the compensated location.

13. The audio device of claim 12, wherein the audio data and location data are generated from a computing device configured to manage information associated with the vehicle.

14. The audio device of claim 13, wherein the computing device comprises an electronic flight bag (EFB), and wherein the EFB generates at least one of the audio data and location data in response to signals received from a sensor.

15. The audio device of claim 12, wherein at least one of the audio data and location data are received from an object position data source.

16. The audio device of claim 13, wherein the audio data and location data are received wirelessly from the computing device.

17. An audio device configured to be worn on a head of an operator of a vehicle, comprising:
    a memory; and
    a processor, wherein the processor is configured to:

receive audio data and location data, the location data indicating where the audio data should be rendered relative to the vehicle;

track a head position of the operator of the vehicle, wherein the head position is determined from a sensor managed by the vehicle;

calculate a compensated location of where the audio data should be rendered based on the location data and the head position of the operator of the vehicle; and spatially render the audio data at the compensated location.

18. The audio device of claim 17, wherein the head position is further determined by an additional sensor attached to the audio device.

* * * * *